US008701518B2

(12) United States Patent
Chen et al.

(10) Patent No.: US 8,701,518 B2
(45) Date of Patent: Apr. 22, 2014

(54) SUSTAINING MANIPULATOR ARM

(75) Inventors: Dar-Zen Chen, Taipei (TW); Po-Yang Lin, Taipei (TW); Wen-Bin Hsieh, Taipei (TW)

(73) Assignee: National Taiwan University, Taipei (TW)

( * ) Notice: Subject to any disclaimer, the term of this patent is extended or adjusted under 35 U.S.C. 154(b) by 575 days.

(21) Appl. No.: 13/015,650

(22) Filed: Jan. 28, 2011

(65) Prior Publication Data

US 2011/0308347 A1 Dec. 22, 2011

(30) Foreign Application Priority Data

Jun. 21, 2010 (TW) ................................ 99120136 A

(51) Int. Cl.
*B25J 17/00* (2006.01)
*B25J 17/02* (2006.01)
*B25J 18/00* (2006.01)

(52) U.S. Cl.
USPC ........................................... 74/490.01; 901/14

(58) Field of Classification Search
USPC .......... 74/490.01, 490.05; 901/14, 15, 17, 19, 901/23, 27, 28
See application file for complete search history.

(56) References Cited

U.S. PATENT DOCUMENTS

| | | | | |
|---|---|---|---|---|
| 316,459 | A * | 4/1885 | How | 248/586 |
| 1,272,845 | A * | 7/1918 | Peck | 248/586 |
| 2,131,693 | A * | 9/1938 | Smith | 355/67 |
| 3,417,953 | A * | 12/1968 | Hillquist et al. | 248/284.1 |
| 3,973,748 | A * | 8/1976 | Nagasaka | 248/571 |
| 4,080,530 | A | 3/1978 | Krogsrud | |
| 4,160,536 | A | 7/1979 | Krogsrud | |
| 4,796,162 | A | 1/1989 | Krogsrud | |
| 4,953,822 | A * | 9/1990 | Sharber et al. | 248/281.11 |
| 5,288,043 | A * | 2/1994 | Tigliev | 248/123.11 |
| 5,609,316 | A * | 3/1997 | Tigliev | 248/123.11 |
| 5,618,090 | A | 4/1997 | Montague et al. | |
| 6,328,458 | B1 | 12/2001 | Bell et al. | |
| 6,471,165 | B2 * | 10/2002 | Twisselmann | 248/123.11 |
| 6,550,734 | B1 * | 4/2003 | Spadea | 248/280.11 |
| 7,131,916 | B2 * | 11/2006 | Griffin | 473/417 |
| 8,272,290 | B2 * | 9/2012 | Zhang et al. | 74/490.01 |
| 8,317,453 | B2 * | 11/2012 | Givens | 414/680 |
| 2008/0028883 | A1 * | 2/2008 | Inada et al. | 74/490.05 |

* cited by examiner

*Primary Examiner* — Troy Chambers
*Assistant Examiner* — Jake Cook
(74) *Attorney, Agent, or Firm* — Alan Kamrath; Kamrath IP Lawfirm, P.A.

(57) ABSTRACT

A sustaining manipulator arm capable of being set on a ground includes a first linkage set. The first linkage set includes a first link, a second link, a first ball joint, a second ball joint, a third link, and a first elastic element. A first end of the first link is connected to a first revolution element, and the first revolution element has a first revolution direction. A first end of the second link is connected to a second revolution element. The second revolution element has a second revolution direction. The first revolution direction and the second revolution direction are the same direction, and the first revolution element and the second revolution element are on a first plane. The first ball joint is set in the first link. The second ball joint is set in the second link. A first end of the third link is connected to the first ball joint. A second end of the third link is connected to the second ball joint, and the third link is parallel to the first plane. The two ends of the first elastic element are respectively attached to the first link and the third link, and the first elastic clement makes the first linkage set reach static equilibrium.

13 Claims, 2 Drawing Sheets

SUSTAINING MANIPULATOR ARM

BACKGROUND OF THE INVENTION

1. Field of the Invention

The present invention relates to a sustaining manipulator arm. More particularly, the present invention relates to a sustaining manipulator arm with a multi-degree-of-freedom motion and being capable of reaching static equilibrium.

2. Description of the Related Art

A static balancing mechanism is capable of keeping the mechanism at static equilibrium at any stop position during a motion process. This kind of mechanism can be widely applied in supporting or pick-and-place mechanisms, such as: a table lamp, an operation lamp, a monitor support bracket, a manipulator arm, and so on. For example, this kind of mechanism can also be applied in U.S. Pat. No. 6,328,458 (Bell et al., Dec.11, 2001), U.S. Pat. No. 4,080,530 (Krogsrud, Mar. 21, 1978), U.S. Pat. No. 4,796,162 (Krogsrud, Jan. 3, 1989) and U.S. Pat. No. 5,618,090 (Montague et al., Apr. 8, 1997). The static balancing mechanism can be accomplished by counterbalancing, spring balancing or many other equivalent methods. The method of adding a spring utilizes a spring potential energy change to balance a gravitational potential energy change of the mechanism, thereby achieving a conservative energy system which keeps the total potential energy unchanged. Comparing to the method of counterbalancing, the method of adding a spring causes a relatively small burden to the overall weight of the system, and the spring is characterized in low cost and easy production.

Most conventional spring static balancing mechanisms cannot reach complete gravitational equilibrium at an arbitrary position due to the limitation of the structure arrangement or spring installation position of the mechanism. Therefore, a conservative energy system cannot be accomplished, thus resulting in imperfect balance. Further, a conventional spring static balancing mechanism is mostly composed of a planar mechanism or multiple vertical planar mechanisms, which are assembled by multiple planar parallelogram linkages. However, due to the limitation of the planar structure, even though vertical rotary shafts have been added to increase one degree of freedom of the mechanism in a horizontal motion under the condition of keeping the operational plane of the planar parallel four-bar linkages perpendicular, three spatial rotational degrees of freedom motion still cannot be accomplished.

Further, in known prior arts, the axial direction of a revolution element (such as a revolute pair) of a known parallelogram linkage must be in a horizontal direction, and the motion track of a coupler of the parallelogram linkage is a circular route. With regard to a known parallelogram linkage structure, no matter how two or multiple parallelogram linkages are connected, it can only perform planar motion. Therefore, it can only reach limited positions.

For example, U.S. Pat. No. 3,973,748 (Nagasaka, Aug. 10, 1976) discloses a structure composed of a basic planar parallelogram connecting bar and a diagonal spring. A cam is added to an extended point of the spring, to improve the balance caused by a friction condition change.

U.S. Pat. No. 4,160,536 (Krogsrud, Jul. 10, 1979) discloses a structure composed of two connected parallelogram arms. A nylon shoe is connected to a slide, such that a spring can be hidden from view, and different counterbalancing forces can be reached by utilizing the slide to adjust the position.

Therefore, there is a need to provide a sustaining manipulator arm, which can reach static equilibrium when the manipulator arm stays at an arbitrary position, and can perform a multi-degree-of-freedom motion, to mitigate and/or obviate the aforementioned problems.

SUMMARY OF THE INVENTION

It is an object of the present invention to provide a sustaining manipulator arm, which is capable of reaching static equilibrium.

It is another object of the present invention to provide a sustaining manipulator arm, with the end of its linkage performing a multi-degree-of-freedom motion.

To achieve another of the abovementioned objects, the sustaining manipulator arm of the present invention comprises a first linkage set, a second linkage set and a third linkage set. The first linkage set comprises: a first link, with a first end of the first link connected to a first revolution element, and with the first revolution element having a first revolution direction; a second link, with a first end of the second link connected to a second revolution element, with the second revolution element having a second revolution direction, with the first revolution direction and the second revolution direction being the same direction, and with the first revolution element and the second element on a vertical plane; a first ball joint set in the first link; a second ball joint set in the second link; a third link, with a first end of the third link connected to the first ball joint, with a second end of the third link connected to the second ball joint, and with the third link perpendicular to the ground; and a first elastic element. Two ends of the first elastic element are respectively attached to the first link and the third link, and the first elastic element makes the first linkage set reach static equilibrium.

To achieve another of the abovementioned objects, the sustaining manipulator arm of the present invention comprises a first linkage set, a second linkage set and a third linkage set. The first linkage set comprises: a first link, wherein a first end of the first link is connected to a first revolution element, and the first revolution element has a first revolution direction; a second link, wherein a first end of the second link is connected to a second revolution element, and the second revolution element has a second revolution direction, wherein the first revolution direction and the second revolution direction are the same direction, and the first revolution element and the second element are on a vertical plane; a first ball joint, which is set in the first link; a second ball joint, which is set in the second link; a third link, wherein a first end of the third link is connected to the first ball joint, a second end of the third link is connected to the second ball joint, and the third link is perpendicular to the ground; and a first elastic element, wherein two ends of the first elastic element are respectively attached to the first link and the third link, and the first elastic element makes the first linkage set reach static equilibrium.

The second linkage set comprises: a fourth link, with a first end of the fourth link connected to a second end of the first link via a third revolution element, and with the third revolution element having a third revolution direction; a fifth link, with a first end of the fifth link connected to a second end of the second link via a fourth revolution element, with the fourth revolution element having a fourth revolution direction, with the third revolution direction and the fourth revolution direction being the same direction, and with the third revolution element and the fourth revolution element on a second plane; a third ball joint set in the fourth link; a fourth ball joint set in the fifth link; a sixth link, with a first end of the sixth link connected to the third ball joint, with a second end of the sixth link connected to the fourth ball joint, and with the sixth link parallel to the second plane; and a second elastic element. Two ends of the second elastic element are respectively attached to the fourth link and the sixth link, and the second elastic element makes the second linkage set reach static equilibrium.

The third linkage set comprises: a seventh link, with a first end of the seventh link connected to a second end of the fourth link via a fifth revolution element, with the fifth revolution element having a fifth revolution direction, and with wherein the fifth revolution direction perpendicular to the third revolution direction; an eighth link, with a first end of the eighth link connected to a second end of the fifth link via a sixth revolution element, with the sixth revolution element having a sixth revolution direction, with the fifth revolution direction and the sixth revolution direction being the same direction, the sixth revolution direction perpendicular to the fourth revolution direction, and with the fifth revolution element and the sixth revolution element on a third plane; a fifth ball joint set in the seventh link; a sixth ball joint set in the eighth link; a ninth link, with a first end of the ninth link connected to the fifth ball joint, with a second end of the ninth link connected to the sixth ball joint, and with the ninth link parallel to the third plane; and a third elastic element. Two ends of the third elastic element are respectively pivoted to the seventh link and the ninth link, and the third elastic element makes the third linkage set reach static equilibrium.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views.

DETAILED DESCRIPTION OF THE PREFERRED EMBODIMENTS

Figure 1:
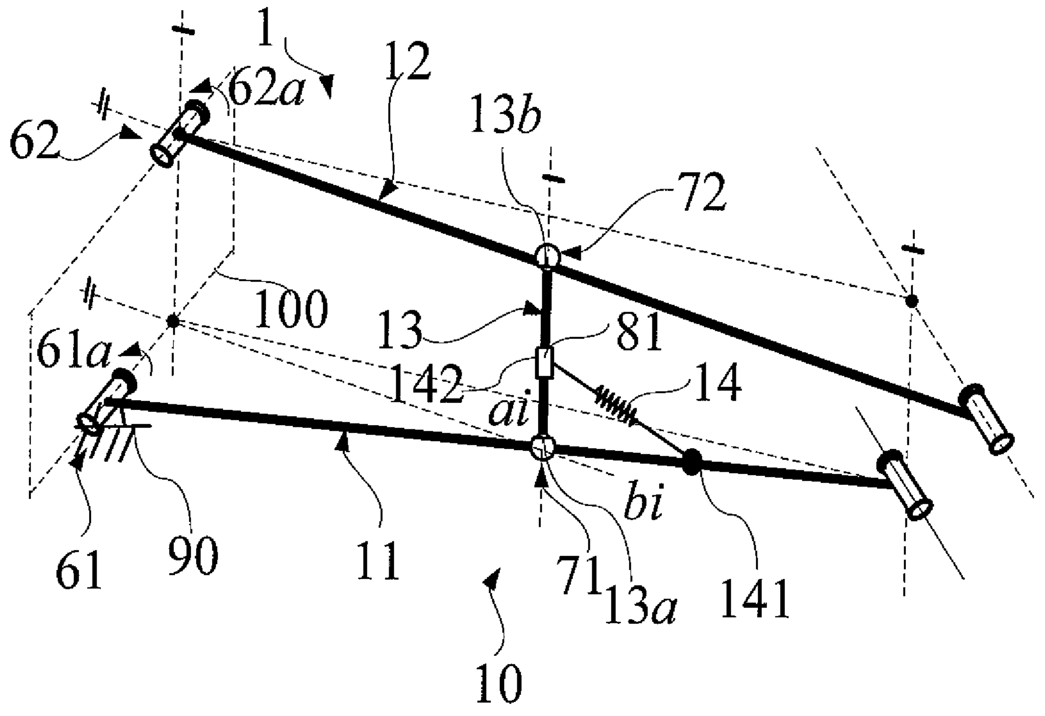
FIG. 1 illustrates a schematic drawing of a sustaining manipulator arm according to a first embodiment of the present invention.

Please refer to FIG. 1, which illustrates a schematic drawing of a sustaining manipulator arm according to a first embodiment of the present invention. The sustaining manipulator arm 1 comprises a first linkage set 10, which is composed of a four-bar linkage structure. The first linkage set 10 comprises a first link 11, a second link 12, a first ball joint 71, a second ball joint 72, a third link 13, and a first elastic element 14.

A first end 11*a* of the first link 11 is connected to a first revolution element 61, and the first revolution element 61 has a first revolution direction 61*a*. A first end 12*a* of the second link 12 is connected to a second revolution element 62, and the second revolution element 62 has a second revolution direction 62*a*. The first revolution direction 61*a* and the second revolution direction 62*a* are the same direction.

In the embodiment shown in FIG. 1, although the first revolution element 61 is deviated from the vertical axial direction of the second revolution element 62, the first revolution element 61 and the second revolution element 62 belongs to the same first plane 100, to avoid interference among linkages, such that the element arrangement of the sustaining manipulator arm 1 is more flexible.

In this embodiment, the first revolution element 61 and the second revolution element 62 are respectively a revolute pair, which rotates along a horizontal axis. The first link 11 and the second link 12 respectively move via the first revolution element 61 and the second revolution element 62.

Please note that the first revolution direction 61*a* and the second revolution direction 62*a* are not limited to the above embodiment. However, the first revolution direction 61*a* and the second revolution direction 62*a* must face the same direction.

The first ball joint 71 is set in the first link 11, and the second ball joint 72 is set in the second link 12. A first end 13*a* of the third link 13 is connected to the first ball joint 71, and a second end 13*b* of the third link 13 is connected to the second ball joint 72. The third link 13 is parallel to the first plane 100, the first plane 100 is perpendicular to a ground 90, and the third link 13 is perpendicular to the ground 90. The position of the third link 13 is not limited. Please note that the ball joint can also be replaced by other equivalent elements. For example, the ball joint can be replaced by a spherical joint composed of three homocentric revolute pairs.

Two ends 141 and 142 of the first elastic element 14 are respectively attached to the first link 11 and the third link 13. The first elastic element 14 makes the overall first linkage set 10 reach static equilibrium. In this embodiment, one end 142 of the first elastic element 14 is connected to the third link 13 via a first collar 81, and the first collar 81 is used for being sleeved onto an appropriate position of the third link 13.

When the sustaining manipulator arm 1 stays at different positions, gravity would generate different moments to the first revolution element 61 and the second revolution element 62. At this time, the first elastic element 14 would provide different balancing moments according to different elongation changes. The summation of the gravitational potential energy of each of the links (including the first link 11, the second link 12 and the third link 13) and the total stored energy of the first elastic element 14 is a constant, such that the energy can convert between the gravitational potential energy and the spring potential energy at different positions. Therefore, with regard to the motion of each link, static equilibrium can be reached without the need of additional energy.

The position where the first elastic element 14 attached to the first link 11 and the third link 13 and the elastic coefficient of the first elastic element 14 can be obtained according to the following formulas:

According to the law of conservation of energy:

$$K_i a_i b_i = \mu_i g \sigma_i \tag{1}$$

wherein the distance between the end 142 of the first elastic element 14 and the first ball joint 71 is ai, the distance between the end 141 of the first elastic element 14 and the first ball joint 71 is bi, the elastic coefficient of the first elastic element 14 is Ki, and g is acceleration of gravity, and wherein:

$$\mu_i = m_i + \hat{m}_i + m_i^* + \sum_{j=i}^{3} (m_j + \hat{m}_j + m_j^*) \tag{2}$$

-continued $$\sigma_i = \frac{m_i s_i + \hat{m}_i \hat{s}_i + m_i^* c_i + \sum_{j=i}^{3} (-m_j r_i - \hat{m}_j \hat{r}_j - m_j^* r_i)}{m_i + \hat{m}_i + m_i^* + \sum_{j=i}^{3} (m_j + \hat{m}_j + m_j^*)} \quad (3)$$

Figure 2:
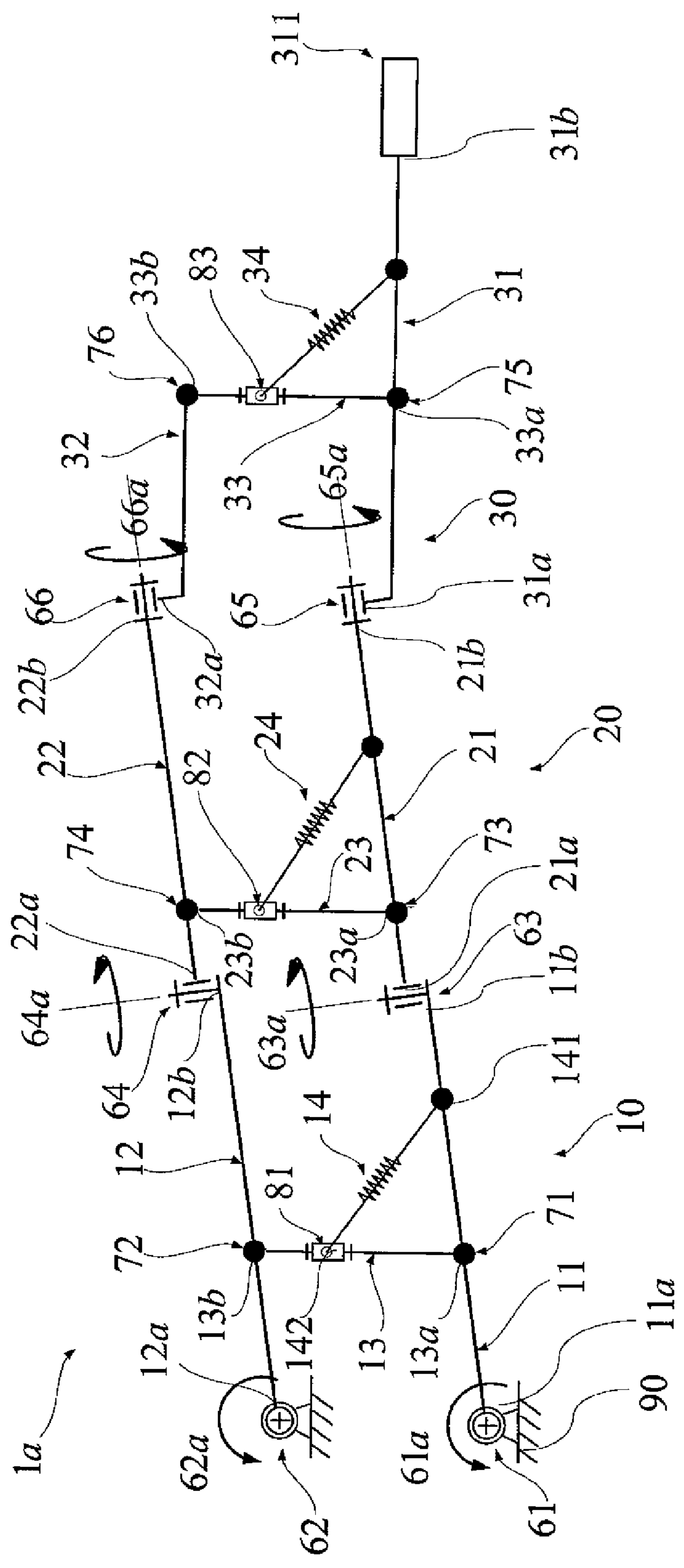
FIG. 2 illustrates a schematic drawing of the sustaining manipulator arm according to a second embodiment of the present invention.

Please refer to FIG. 2, which illustrates a schematic drawing of the sustaining manipulator arm according to a second embodiment of the present invention. The sustaining manipulator arm 1*a* comprises a first linkage set 10, a second linkage set 20 and a third linkage set 30. The structure of the first linkage set 10 is similar to that as described in the first embodiment. Therefore, there is no need for further description. The first revolution element 61 and the second revolution element 62 are mounted to the ground 90, and rotary shafts of the first revolution element 61 and the second revolution element 62 are in a horizontal direction.

The structure of the second linkage set 20 is similar to that of the first linkage set 10. The second linkage set 20 is assembled to the first linkage set 10. The second linkage set 20 comprises a fourth link 21, a fifth link 22, a third ball joint 73, a fourth ball joint 74, a sixth link 23 and a second elastic element 24.

A first end 21*a* of the fourth link 21 is connected to a second end 11*b* of the first link 11 via a third revolution element 63. The third revolution element 63 has a third revolution direction 63*a*, and the third revolution direction 63*a* is perpendicular to the first revolution direction 61*a*.

A first end 22*a* of the fifth link 22 is connected to a second end 12*b* of the second link 12 via a fourth revolution element 64. The fourth revolution element 64 has a fourth revolution direction 64*a*. The third revolution direction 63*a* and the fourth revolution direction 64*a* are the same direction. The fourth revolution direction 64*a* is perpendicular to the second revolution direction 62*a*, and the third revolution element 63 and the fourth revolution element 64 are on a second plane. The second plane is perpendicular to the ground 90. In this embodiment, the third revolution element 63 and the fourth revolution element 64 are respectively a revolute pair.

The third ball joint 73 is set in the fourth link 21, and the fourth ball joint 74 is set in the fifth link 22. A first end 23*a* of the sixth link 23 is connected to the third ball joint 73, and a second end 23*b* of the sixth link 23 is connected to the fourth ball joint 74. The sixth link 23 is parallel to the second plane, the second plane is perpendicular to the ground 90, and the sixth link 23 is perpendicular to the ground 90. The position of the sixth link 23 is not limited.

Two ends of the second elastic element 24 are respectively attached to the fourth link 21 and the sixth link 23. The second elastic element 24 makes the second linkage set 20 reach static equilibrium. In this embodiment, one end of the second elastic element 24 is connected to the sixth link 23 via a second collar 82, and the second collar 82 is used for being sleeved onto an appropriate position of the sixth link 23.

The position where the second elastic element 24 pivoted to the fourth link 21 and the sixth link 23 and the elastic coefficient of the second elastic element 24 can be obtained according to the aforementioned formulas (1), (2) and (3).

The structure of the third linkage set 30 is similar to that of the first linkage set 10. The third linkage set 30 is assembled to the second linkage set 20. The third linkage set 30 comprises a seventh link 31, an eighth link 32, a fifth ball joint 75, a sixth ball joint 76, a ninth link 33, and a third elastic element 34.

A first end 31*a* of the seventh link 31 is connected to a second end 21*b* of the fourth link 21 via a fifth revolution element 65. The fifth revolution element 65 has a fifth revolution direction 65*a*, and the fifth revolution direction 65*a* is perpendicular to the third revolution direction 63*a*. In this embodiment, a second end 31*b* of the seventh link 31 comprises an end effector 311. Because the first linkage set 10, the second linkage set 20 and the third linkage set 30 respectively provide one degree-of-freedom motion, the end effector 311 has three degrees of freedom.

A first end 32*a* of the eighth link 32 is connected to a second end 22*b* of the fifth link 22 via a sixth revolution element 66. The sixth revolution element 66 has a sixth revolution direction 66*a*. The fifth revolution direction 65*a* and the sixth revolution direction 66*a* are the same direction. The sixth revolution direction 66*a* is perpendicular to the fourth revolution direction 64*a*, and the fifth revolution element 65 and the sixth revolution element 66 are on a third plane. The third plane is perpendicular to the ground 90. In this embodiment, the fifth revolution element 65 and the sixth revolution element 66 are respectively a revolute pair.

The fifth ball joint 75 is set in the seventh link 31, and the sixth ball joint 76 is set in the eighth link 32. A first end 33*a* of the ninth link 33 is connected to the fifth ball joint 75, and a second end 33*b* of the ninth link 33 is connected to the sixth ball joint 76. The ninth link 33 is parallel to the third plane, the third plane is perpendicular to the ground 90, and the ninth link 33 is perpendicular to the ground 90. The position of the ninth link 33 is not limited.

Two ends of the third elastic element 34 are respectively attached to the seventh link 31 and the ninth link 33. The third elastic element 34 makes the third linkage set 30 reach static equilibrium. In this embodiment, one end of the third elastic element 34 is connected to the ninth link 33 via a third collar 83, and the third collar 83 is used for being sleeved onto an appropriate position of the ninth link 33.

The position where the third elastic element 34 is pivoted to the seventh link 31 and the ninth link 33 and the elastic coefficient of the third elastic element 34 can be obtained according to the aforementioned formulas (1), (2) and (3).

Please note that: although the third revolution direction 63*a* and the fourth revolution direction 64*a* are respectively perpendicular to the first revolution direction 61*a* and the second revolution direction 62*a*, and although the fifth revolution direction 65*a* and the sixth revolution direction 66*a* are respectively perpendicular to the third revolution direction 63*a* and the fourth revolution direction 64*a*, the sequence of the revolution direction of each revolution element is not limited to the embodiment as shown in FIG. 2.

Further, the aforementioned second embodiment connects three linkage sets to perform a three-degree-of-freedom motion. Please note that the present invention can also connect more than three, at most six, linkage sets.

The sustaining manipulator arm 1*a* of the present invention can be applied in automated manipulator arms and each kind of supports, such as monitor supports, table lamp supports, operation lamp supports, operation equipment supports, kitchen cabinet supports, window supports, robot arm supports, and so on. At this time, the sustaining manipulator arm 1*a* can comprise three driving devices (not shown), which are respectively used for driving the first revolution element 61, the third revolution element 63 and the fifth revolution element 65, to drive the first link 11, the fourth link 21 and the seventh link 31 to rotate, such that the end effector 311 can reach a designated position. As shown in FIG. 2, in this embodiment, the first link 11, the fourth link 21 and the seventh link 31 are active link elements, while the second link 12, the fifth link 22 and the eighth link 32 are passive link elements.

The sustaining manipulator arms 1 and 1*a* of the present invention themselves can bear gravity, and can stay in static equilibrium. Therefore, when operating the sustaining manipulator arms 1 and 1*a*, relatively less braking force is needed to overcome system inertia, thereby significantly improving driving energy efficiency. Further, because the gravity balancing mechanism and the driving mechanism belong to different systems, the position of the end effector 311 can be more precise.

Although the present invention has been explained in relation to its preferred embodiments, it is to be understood that many other possible modifications and variations can be made without departing from the spirit and scope of the invention as hereinafter claimed.

What is claimed is:

1. A sustaining manipulator arm comprising:

a first linkage set comprising:

a first link, wherein a first end of the first link is connected to a first revolution element, and wherein the first revolution element has a first revolution direction;

a second link, wherein a first end of the second link is connected to a second revolution element, wherein the second revolution element has a second revolution direction, wherein the first revolution direction and the second revolution direction are the same direction, and wherein the first revolution element and the second revolution element are on a first plane;

a first ball joint set in the first link;

a second ball joint set in the second link;

a third link, wherein a first end of the third link is connected to the first ball joint, a second end of the third link is connected to the second ball joint, and the third link is parallel to the first plane; and a first elastic element, wherein two ends of the first elastic element are respectively attached to the first link and the third link, and wherein the first elastic element makes the first linkage set reach static equilibrium;

a second linkage set comprising:

a fourth link, wherein a first end of the fourth link is connected to a second end of the first link via a third revolution element, wherein the third revolution element has a third revolution direction, and wherein the third revolution direction is perpendicular to the first revolution direction;

a fifth link, wherein a first end of the fifth link is connected to a second end of the second link via a fourth revolution element, wherein the fourth revolution element has a fourth revolution direction, wherein the third revolution direction and the fourth revolution direction are the same direction, wherein the fourth revolution direction is perpendicular to the second revolution direction, and wherein the third revolution element and the fourth revolution element are on a second plane;

a third ball joint set in the fourth link;

a fourth ball joint set in the fifth link;

a sixth link, wherein a first end of the sixth link is connected to the third ball joint, wherein a second end of the sixth link is connected to the fourth ball joint, and wherein the sixth link is parallel to the second plane; and a second elastic element, wherein two ends of the second elastic element are respectively attached to the fourth link and the sixth link, and wherein the second elastic element makes the second linkage set reach static equilibrium; and a third linkage set comprising:

a seventh link, wherein a first end of the seventh link is connected to a second end of the fourth link via a fifth revolution element, wherein the fifth revolution element has a fifth revolution direction, and wherein the fifth revolution direction is perpendicular to the third revolution direction;

an eighth link, wherein a first end of the eighth link is connected to a second end of the fifth link via a sixth revolution element, wherein the sixth revolution element has a sixth revolution direction, wherein the fifth revolution direction and the sixth revolution direction are the same direction, wherein the sixth revolution direction is perpendicular to the fourth revolution direction, and wherein the fifth revolution element and the sixth revolution element are on a third plane;

a fifth ball joint set in the seventh link;

a sixth ball joint set in the eighth link;

a ninth link, wherein a first end of the ninth link is connected to the fifth ball joint, wherein a second end of the ninth link is connected to the sixth ball joint, and wherein the ninth link is parallel to the third plane; and a third elastic element, wherein two ends of the third elastic element are respectively pivoted to the seventh link and the ninth link, and wherein the third elastic element makes the third linkage set reach static equilibrium.

2. The sustaining manipulator arm as claimed in claim 1, wherein the sustaining manipulator arm can be set on a ground, and wherein the third link is perpendicular to the ground.

3. The sustaining manipulator arm as claimed in claim 2, wherein the first plane is perpendicular to the ground.

4. The sustaining manipulator arm as claimed in claim 1, wherein the sustaining manipulator arm can be set on a ground, wherein the sixth link is perpendicular to the ground, and wherein the ninth link is perpendicular to the ground.

5. The sustaining manipulator arm as claimed in claim 4, wherein the second plane is perpendicular to the ground, and wherein the third plane is perpendicular to the ground.

6. The sustaining manipulator arm as claimed in claim 1, wherein a second end of the seventh link comprises an end effector having three degrees of freedom.

7. The sustaining manipulator arm as claimed in claim 1, wherein rotary shafts of the first revolution element and the second revolution element are in a horizontal direction.

8. The sustaining manipulator arm as claimed in claim 1, wherein one end of the first elastic element, one end of the second elastic element, and one end of the third elastic element are respectively connected to the third link, the sixth link, and the ninth link via a first collar, a second collar, and a third collar.

9. The sustaining manipulator arm as claimed in claim 2, wherein the sixth link is perpendicular to the ground, and wherein the ninth link is perpendicular to the ground.

10. The sustaining manipulator arm as claimed in claim 9, wherein the second plane is perpendicular to the ground, and the third plane is perpendicular to the ground.

11. The sustaining manipulator arm as claimed in claim 2, wherein a second end of the seventh link comprises an end effector having three degrees of freedom.

12. The sustaining manipulator arm as claimed in claim 2, wherein rotary shafts of the first revolution element and the second revolution element are in a horizontal direction.

13. The sustaining manipulator arm as claimed in claim 2, wherein one end of the first elastic element, one end of the second elastic element, and one end of the third elastic element are respectively connected to the third link, the sixth link, and the ninth link via a first collar, a second collar, and a third collar.

* * * * *